US011851450B2

(12) United States Patent
Even

(10) Patent No.: US 11,851,450 B2
(45) Date of Patent: Dec. 26, 2023

(54) MONOSUBSTITUTED DIPHENYLSILANES AND SYNTHESIS THEREOF

(71) Applicant: Honeywell Federal Manufacturing & Technologies, LLC, Kansas City, MO (US)

(72) Inventor: Dakota Even, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 6 days.

(21) Appl. No.: 17/528,747

(22) Filed: Nov. 17, 2021

(65) Prior Publication Data

US 2023/0151033 A1    May 18, 2023

(51) Int. Cl.
    *C07F 7/08*  (2006.01)
    *B01J 31/22* (2006.01)

(52) U.S. Cl.
    CPC ......... *C07F 7/0874* (2013.01); *B01J 31/2273* (2013.01); *B01J 2531/16* (2013.01)

(58) Field of Classification Search
    CPC ... C07F 7/0874; C07F 7/0896; B01J 31/2269; B01J 31/2273; B01J 23/72; B01J 23/868; B01J 23/885; B01J 23/8926; B01J 23/94; B01J 27/055; B01J 27/122; B01J 27/1817; B01J 29/0316; B01J 29/0333; B01J 29/0352; B01J 29/0356; B01J 29/042; B01J 29/044; B01J 29/072; B01J 29/14; B01J 29/24; B01J 29/46; B01J 29/56; B01J 29/63; B01J 29/68; B01J 31/26; B01J 31/403; B01J 2531/16
    See application file for complete search history.

(56) References Cited

U.S. PATENT DOCUMENTS

| | | |
|---|---|---|
| 9,120,711 B2 | 9/2015 | Nolan et al. |
| 9,200,013 B2 | 12/2015 | Stepp et al. |
| 2014/0206869 A1* | 7/2014 | Brandstadt ............... C08K 5/01 548/402 |
| 2017/0240485 A1 | 8/2017 | Cantat et al. |

FOREIGN PATENT DOCUMENTS

| | | |
|---|---|---|
| WO | 2019/060475 | 3/2019 |
| WO | 2020/228923 | 11/2020 |
| WO | 2021/029247 | 2/2021 |

OTHER PUBLICATIONS

D. Gao et al., 19 Chemistry a European Journal, 11143-11147 (2013) (Year: 2013).*
Y. Moritani et al., 122 Journal of the American Chemical Society, 6797-6798 (2000) (Year: 2000).*
A. Purkayashtha et al., 1 Silicon Chemistry, 229-232 (2002) (Year: 2002).*
J. Blandez et al., 53 Angew. Chem. Int. Ed., 12581-12586 (2014) (Year: 2014).*
Y. Gunji et al., 35 Chemistry Letters, 714-715 (2006) (Year: 2006).*
O. Santoro et al., 49 Chem. Commun., 10483-10485 (2013) (Year: 2013).*
S. Díez-González et al., 14 Chemistry A European Journal, 158-168 (2008) (Year: 2008).*
W. Bai et al., 36 Applied Organometallic Chemistry (2022) (Year: 2022).*
Tsuchido et al., "Gold (I) complexes with chloro(diaryl)silyl ligand. Stoichiometric reactions and catalysis for O-functionalization of organosilane," Tetrahedron (2020), 76 (15): 131076, 7 pages.
Vijjamarri et al., "Dehydrogenative coupling of alcohols and carboxylic acids with hydrosilanes catalyzed by a salen-Mn(V) complex," Catalysis Science & Technology, Jan. 2016, 6 (11), 3886-3892, 8 pages.
Corriu et al., "Alcoolyse Selective D'Organosilanes Catalysee Par Un Complexe Du Rhodium," Journal of Organometallic Chemistry (1976), 114 (2): 135-144, 10 pages.
Gunji et al., "Convenient and Selective Preparation of Mono-alkoxyphenylsilanes from Phenylsilane and Alcohols," Chemistry Letters, vol. 35, No. 7 (2006), pp. 714-715, 2 pages.
Morris et al., Heavier Alkaline-Earth Catalyzed Dehydrocoupling of Silanes and Alcohols for the Synthesis of Metallo-Polysilylethers, Chem. Eur. J., 2020, 26 (13): 2954-2966, 13 pages.
Reuter et al., "Photoactivated silicon-oxygen and silicon-nitrogen heterodehydrocoupling with a commercially available iron compound," Dalton Trans., 2020, 49 (9): 2972-2978, 7 pages.
Horner et al., "Chemoselektive Mono-Und Disilyletherbildung Aus Tertiaren Und Sekundaren Silanen," Journal of Organometallic Chemistry, 282 (1985), 155-174, 20 pages.
Uvarov et al., "First study of rhodium(I) complexes with chiral sulfur-containing terpenoids as catalytic systems for ketone hydrosilylation," Phosphorus, Sulfur, and Silicon and the Related Elements, vol. 195, Issue 5, 2020, pp. 376-387, 4 pages.
Buonomo et al., "Scalable Synthesis of Hydrido-Disiloxanes from Silanes: A One-Pot Preparation of 1,3-Diphenyldisiloxane from Phenylsilane," Synthesis (Stuttg), Jan. 2018, 50 (2): 278-281, 9 pages.
Shankar et al., "Catalytic oxidation of diorganosilanes to 1,1,3,3-tetraorganodisiloxanes with gold nanoparticle assembly at the water-chloroform interface," New J. Chem., 2019, 43 (2): 813-819, 7 pages.
Beppu et al., "Hydrosilane synthesis via catalytic hydrogenolysis of halosilanes using a metal-ligand bifunctional iridium catalyst," Journal of Organometallic Chemistry 869 (2018) 75-80, 6 pages.
Haque et al., "Synthesis of Allyl Functionalized Silacrown Ethers and Their Application—A Review," J. Chosun Natural Sci., vol. 13, No. 2 (2020) pp. 41-46, 6 pages.

(Continued)

*Primary Examiner* — Alexander R Pagano
(74) *Attorney, Agent, or Firm* — HOVEY WILLIAMS LLP

(57) ABSTRACT

A method for forming monosubstituted diphenylsilanes is broadly provided. The method involves reacting diphenylsilane with an alcohol in the presence of a catalyst and a strong base activator. The reaction results in high selectivity to addition at only one hydrogen site.

16 Claims, 2 Drawing Sheets

(56) References Cited

OTHER PUBLICATIONS

Oddon et al., "Silacrown Ethers: Synthesis of Macrocyclic Diphenylpolyethyleneglycol Mono- and Disilanes," Tetrahedron Letters, vol. 34, No. 46, pp. 7413-7416, 1993, 4 pages.
Miller et al., "Alkoxides of Silicon Containing Silicon-Hydrogen Bonds," J. Am. Chem. Soc., 1957, 79 (21): 5604-5606, 5 pages.
Machine translation of WO2020228923, 28 pages.
Machine translation of WO2021029247, 31 pages.

\* cited by examiner

MONOSUBSTITUTED DIPHENYLSILANES AND SYNTHESIS THEREOF

STATEMENT REGARDING FEDERALLY SPONSORED RESEARCH OR DEVELOPMENT

This invention was made with Government support under Contract No. DE-NA-0002839, awarded by the United States Department of Energy/National Nuclear Security Administration. The Government has certain rights in the invention.

BACKGROUND

Field

The present disclosure relates to methods of synthesizing monosubstituted diphenylsilanes.

Description of Related Art

Silanes are frequently used in organic synthesis as reducing agents, couple agents, and protective chemicals, for example. Diphenylsilane has two reactive hydrogen atoms bonded with a silicon atom, making the compound highly reactive in comparison to other silanes. However, there has not been a way to reliably form monosubstituted diphenylsilane.

SUMMARY

The present disclosure addresses this need by broadly providing a synthesis method that selectively substitutes only one hydrogen atom of diphenylsilane.

In one embodiment, the method comprises reacting diphenylsilane with an alcohol, water, or both in the presence of a copper catalyst and a base so as to form a monosubstituted diphenylsilane.

In another embodiment, the disclosure provides a reaction method comprising reacting diphenylsilane with an alcohol, water, or both in the presence of N,N'-bis(2,6-diisopropylphenyl)imidazole-2-ylidine n-heterocyclic carbene and a base.

DETAILED DESCRIPTION

Figure 1:
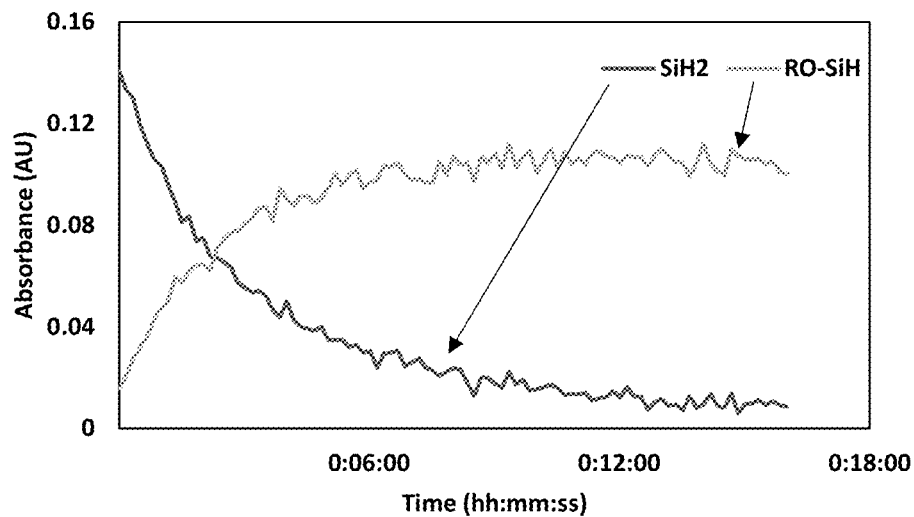
FIG. 1 is a graph showing the $Ph_2SiH_2$ consumption profile for CuIPr-NHC/KOH catalyzed dehydrogenation with water at 40° C. (collected via in-situ FTIR analysis)

The present disclosure is concerned with a method of reacting diphenylsilane with an alcohol and/or water in the presence of a copper catalyst and a base.

Any alcohol (primary, secondary, or tertiary) that will react with diphenylsilane is suitable for use in the present reaction, with primary and secondary alcohols being preferred in some embodiments, and tertiary alcohols preferred in others. Particularly preferred alcohols include those chosen from methyl alcohol, ethyl alcohol, propyl alcohol, butyl alcohol, isopropyl alcohol, tertbutyl alcohol, monohydroxyl-terminated oligomers and polymers such as poly(ethylene glycol)s, other simple alcohols, silanol-containing species such as diphenylsilanol or silanol terminated oligo and polysiloxanes, and mixtures thereof.

The preferred catalyst comprises copper, and particularly those catalysts that result in the consumption of only one Si—H bond of the diphenylsilane. One preferred such catalyst is N,N'-bis(2,6-diisopropylphenyl)imidazole-2-ylidine n-heterocyclic carbene (also known as chloro[1,3-bis(2,6-diisopropylphenyl)imidazol-2-ylidene]copper(I) or [1,3-Bis(2,6-diisopropylphenyl)-imidazole-2-ylidene]copper(I) chloride). This catalyst is available from Sigma-Aldrich (CAS No. 578743-87-0) and has the following structure:

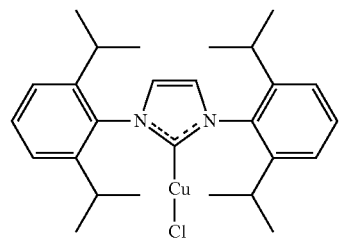

Preferred bases for use in the reaction are strong bases. As used herein, a "strong base," is referred to as ionic bases of hydroxides or alkoxides. Examples of suitable bases include those chosen from alkaline salts such as potassium and sodium tert-butoxide, ethoxide, hydroxide, and mixtures thereof.

Regardless of the alcohol, catalyst, and/or base selected, the inventive method is preferably carried out by first dissolving the catalyst in an aprotic organic solvent (e.g., tetrahydrofuran, dioxane, ether, and mixtures thereof) followed by adding the base with mixing for about 10 minutes to about 25 minutes, and preferably about 15 minutes to about 20 minutes. It is preferred to complete mixing at 25° C. It is also preferred that the quantities be selected such that the catalyst is in molar excess as compared to the base. More particularly, the total mols of catalyst is preferably at least about 1.1, preferably at least about 1.2, and more preferably about 1.2 to about 2 times that of the base.

The catalyst-base solution is then mixed with diphenylsilane and the alcohol(s) in a solvent (e.g., tetrahydrofuran, dioxane, ether, and mixtures thereof). In one embodiment, the mols of alcohol present in the reaction mixture are about 0.8 times to about 1.2 times the mols of diphenylsilane present in the reaction mixture, and preferably about 0.9 times to about 1.1 times the mols of diphenylsilane. Preferably, the alcohol is present at approximately equimolar (i.e., about 1:1) to the diphenylsilane.

The amount of catalyst present in the reaction mixture is typically less than about 4% by weight, preferably less than about 3% by weight, and even more preferable less than about 2% by weight, based on the total weight of diphenylsilane taken as 100% by weight.

The reaction is preferably carried out at a temperature of about 20° C. to about 100° C., more preferably about 25° C. to about 80° C., and even more preferably about 25° C. to about 60° C. It is also preferred that the reaction be carried out for a time period of less than about 60 minutes, more preferably about 5 minutes to about 45 minutes, and even more preferably about 10 minutes to about 30 minutes. In a particularly preferred embodiment, these reaction times and/or temperatures are utilized in conjunction with any of the molar ratio ranges of alcohol to diphenylsilane set forth above.

It will be appreciated that the above reaction forms a monosubstituted diphenylsilane. That is, the invention provides a reaction that preferentially substitutes at only one hydrogen atom of the diphenylsilane molecule. In preferred embodiments, there is nearly 100% selectivity to a single hydrogen. That is, at least about 90% of the reaction product, preferably at least about 95% of the reaction product, more preferably at least about 98% of the reaction product, and even more preferably about 100% of the reaction product will be the monosubstituted diphenylsilane. In one embodiment, those percentages of monosubstitution will be achieved at the reaction times noted above.

In some embodiments, the reaction rate proceeds at a rate of at least about 40 µM, preferably at least about 45 µM, more preferably at least about 50 µM, and even more preferably at least about 60 µM silane per second per mol of base.

The monosubstituted diphenylsilane that is formed is determined by the alcohol selection. In one embodiment, the reaction product comprises a monoalkoxylated diphenylsilane. A preferred monoalkoxylated diphenyl silane is:

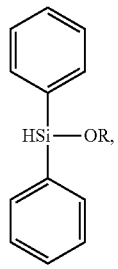

(I)

where R is an alkyl (preferably $C_1$ to about $C_{10}$, more preferably $C_1$ to about $C_8$, and even more preferably $C_1$ to about $C_4$).

In some embodiments, the monosubstituted diphenylsilane is chosen from:

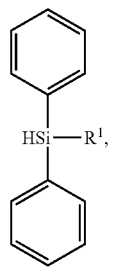

(II)

where $R^1$ is —$(OCH_2CH_2)_nOR$, where:
n is 1 or greater, preferably 2 or greater, and more preferably about 5 to about 10;
and
R is an alkyl (preferably $C_1$ to about $C_{10}$, more preferably $C_1$ to about $C_8$, and even more preferably $C_1$ to about $C_4$); and

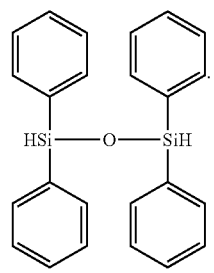

(III)

In embodiments where a structure other than (III) is formed, an alcohol is preferably used in the reaction instead of water. In this instance, the reaction mixture comprises less than about 3% by weight water, preferably less than about 1% by weight water, and more preferably about 0% by weight water, based on the weight of the reaction mixture taken as 100% by weight.

In embodiments where structure (III) is formed, it is preferred that water is used in the reaction in place of the alcohol, as mentioned previously. In this instance, the reaction mixture comprises less than about 3% by weight alcohol, preferably less than about 1% by weight alcohol, and more preferably about 0% by weight alcohol, based on the weight of the reaction mixture taken as 100% by weight.

It will be appreciated that the above-described reactions provide simpler, less expensive, and more facile options for making the described molecules than is provided by existing synthesis routes. Additionally, the disclosed reactions result in high yields of the desired monosubstituted product with minimal byproducts. Further, the monosubstituted diphenylsilanes formed may be useful for generating custom silanes that can be used as, for example, reducing agents, hydrogen sources, alcohol protectors, etc.

Additional advantages of the various embodiments will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments but is not necessarily included. Thus, the present disclosure encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the disclosure. It is to be understood, however, that these examples are provided by way of illustration, and nothing therein should be taken as a limitation upon the overall scope.

Materials

Table 1 shows the materials used in the following experiments. Unless otherwise noted, materials were used as received.

TABLE 1

| Material | Abbreviation | Purity | Source |
| --- | --- | --- | --- |
| Potassium hydroxide | KOH | >86.0% | Sigma |
| Potassium tert-butoxide | KOtBu | >97.0% | TCI |
| Potassium ethoxide | KOEt | 95% | Sigma |
| Diphenylsilane | $Ph_2SiH_2$ | >97.0% | Sigma |
| Tertbutanol | tBuOH | Certified grade | Fisher |
| Isopropyl alcohol | IPA | 99% | Swan |
| Ethanol | EtOH | 200 proof | Fisher |
| Tetrahydrofuran, inhibitor free | THF | >99.9% | Fisher |
| N,N'-bis(2,6-diisopropyl-phenyl)imidazole-2-ylidine n-heterocyclic carbene | CuIPr-NHC | — | Sigma |

EXPERIMENTAL METHODS

1. General Information

All experiments were carried out using dry THF in flame-dried reaction flasks equipped with magnetic stir bar and charged with dry nitrogen before use. Temperature was controlled by a heated water bath. Aside from a hypodermic needle used for venting $H_2$, the reaction flask remained fully sealed. Liquid components were injected into the reaction flask via micropipette under nitrogen as needed.

Solutions of the N,N'-bis(2,6-diisopropylphenyl) imidazole-2-ylidine n-heterocyclic carbene ("CuIPr-NHC") catalyst with base activator were prepared in THF and mixed for a minimum of 15 minutes prior to addition to the reaction system. All CuIPr-NHC catalyst solutions were used on the same day as their preparation. Flame dried reaction flasks charged with dry nitrogen headspace were used in all catalyst solution preparations. CuIPr-NHC was added in excess to the base activator to ensure full base complexation so observed reaction profiles were due to CuIPr-NHC rather than dehydrogenation by the base activator.

Ethanol (EtOH), isopropanol (IPA), and tertbutanol (tBuOH) were used as representative 1°, 2°, and 3° alcohols for the dehydrogenation reaction. Alcohols were stored over 3 A molecular sieves prior to use.

2. Infrared Spectroscopy

Reaction temperature and concentrations were monitored real-time by a Mettler Toledo ReactIR702L FTIR equipped with DiComp probe tip from 750 to 3000 $cm^{-1}$. Concentration of the Si—H bond was monitored at 844 $cm^{-1}$ and 2140 $m^{-1}$ with new absorbance peaks generated at slightly lower wavenumbers that correspond to a once-oxidized silane. Absorbance corresponding to the Si—O linkages was primarily monitored by twin peaks between 1100-1160 $cm^{-1}$. $Ph_2SiH_2$ loading was monitored by the peak at 1428 $cm^{-1}$, corresponding to the phenyl moiety, which is unaffected by the oxidation of the silicon atom. Absorbance data was corrected for temperature and converted to concentration prior to fitting to appropriate kinetic models.

In instances of significant peak overlap, deconvolution was used to provide best estimate of absorbances. Deconvolution was done using Python's LMFIT package by applying least squares estimation of spectral data to compound models which contain a peak for each component in the spectral window and a linear model to offset drift in the spectra baseline. Voigt models were used to fit the underlying absorbance peaks.

3. Product Identification

Products were separated from solvents by a Rotovap system. In addition to IR reaction monitoring, liquid products were probed by 1H NMR in $CDCl_3$ using an Avance AVIII 500 MHz spectrometer to confirm structure.

Results and Discussion

1. Catalytic Activity of CuIPr-NHC

Clean consumption of a single Si—H bond was observed using the CuIPr-NHC catalyst with a KOH base activator and water. The excellent linearity between $Ph_2SiH_2$ and $RO-Ph_2SiH$ absorbances highlights the extent of the selectivity towards the original silane. This is also supported by high linearity ($r^2$=0.988) between 844 $cm^{-1}$ peak decay and peak growth in the 1100-1150 $cm^{-1}$ region which represents Si—O bond formation. Likely, formation of 1,1,3,3-tetraphenyldisiloxane is the reaction product with water either by diphenylsilanol as an active hydroxy species for the dehydrogenation reaction, or through condensation of silanol groups. See FIG. 1.

To test for selectivity against other alcohol containing groups, a stock solution of KOtBu (10 mM) and CuIPR-NHC (15 mM) was prepared in THF. Reaction flasks were flame dried and purged with dry nitrogen, then loaded with dry THF and catalyst solution and heated to 40° C. Final catalyst concentration was 1.4 mM by KOtBu concentration. Si—H bond peak at 844 $cm^{-1}$ was monitored for stability prior to addition of 2× molar amounts of tBuOH, EtOH, or IPA.

Figure 2:
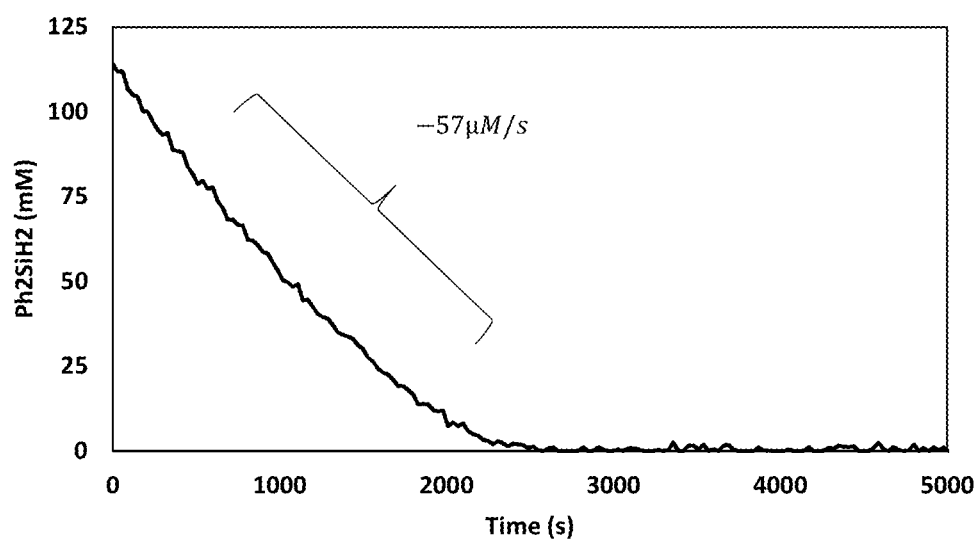
FIG. 2 is a graph showing the $Ph_2SiH_2$ consumption profile for CuIPr-NHC/KOtBu (1.4 mM) catalyzed dehydrogenation with IPA at 40° C. (collected via in-situ FTIR analysis)
Figure 3:
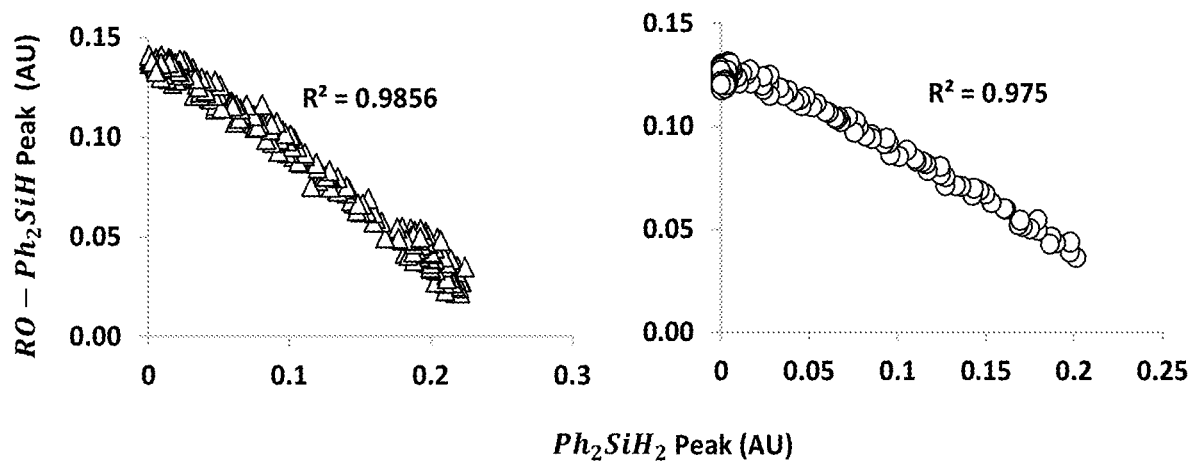
FIG. 3 shows deconvolved peak heights for $Ph_2SiH_2$ versus (left) ethoxydiphenylsilane and (right) isopropoxydiphenylsilane catalyzed by CuIPr-NHC/KOtBu (collected via in-situ FTIR analysis)
Figure 4:
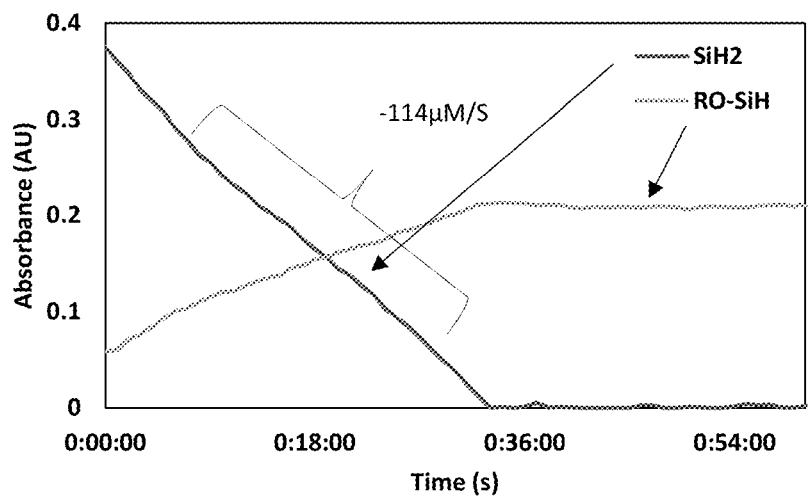
FIG. 4 is a graph depicting the $Ph_2SiH_2$ consumption profile for CuIPr-NHC/KOEt (1.8 mM) catalyzed dehydrogenation with tBuOH at 40° C. (collected via in-situ FTIR analysis).

CuIPr-NHC with KOtBu activator was very reactive towards EtOH and IPA with deconvolution of the Si—H bond showing full decay of the original silane signal in less than one hour (FIG. 2). $Ph_2SiH_2$ and the corresponding alkoxylated silane displayed an excellent linear relationship until full consumption of the former (FIG. 3), indicative of near-full selectivity towards $Ph_2SiH_2$ over $RO-PH_2SiH_2$. After an additional reaction time of 30 minutes from their maximum absorbance values, the ethoxy diphenylsilane and isopropoxy diphenylsilane peaks decayed by 15% and 7% respectively, indicating some residual activity towards the second dehydrogenation step. To isolate product for structural analysis, workups with stoichiometric equivalent amounts of $Ph_2SiH_2$ and IPA or EtOH were repeated in bulk with minimal THF added only as a catalyst carrier. THF and excess alcohol was removed by vacuum and the mass ratio of CuIPr-NHC to $Ph_2SiH_2$ was targeted to be less than 2% to minimize 1H NMR interference. No chromatographic separations were performed to prevent possible hydrolysis of the synthesized silyl ether bonds. NMR spectra confirmed good product resolution, although slight interference in the phenyl ring region was noted, possibly due to water contamination (FIG. 4).

$Ph_2SiH_2$ was non-reactive towards tBuOH with KOtBu as a base activator, likely indicative of strong steric inhibition. However, use of a smaller base, potassium ethoxide, allowed the reaction to proceed to completion to synthesize tertbutoxy diphenylsilane and indicates reactions with tertiary alcohols proceed more readily with smaller base activators, such as potassium ethoxide.

Reaction rate was nearly constant ($0^{th}$ order in silane) over a wide range of the silane concentration and was similar for both IPA and EtOH when KOtBu was used as the base activator. The consumption rate of silane for these reactions was 41 µM silane per second per mol base activator. The reaction rate increased when KOEtBu was used as the activator with tBuOH as the target alcohol to 63 µM silane per second per mol base activator. The increase in the reaction rate with base identity and the zeroth order reaction response to silane and alcohol concentration and likely signifies the rate limiting step involves regeneration of the active catalyst. Poor reactivity towards a once-oxidized silane likely cannot be explained by steric effects alone since reactions with water, primary, secondary, and tertiary alcohols all showed similar reaction patterns. Though not wishing to be bound by theory, the believed activation route for the CuIPr-NHC catalyst is:

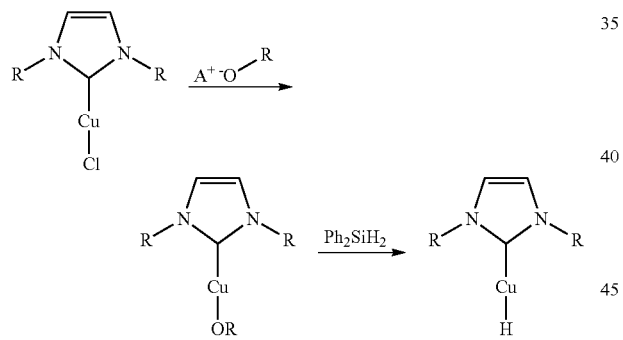

The near-full selectivity of CuIPr-NHC towards removal of only a single hydrogen site allows for a novel approach to production of customizable monoalkoxysilanes with possible use as reducing agents or alcohol protectors.

I claim:

1. A method of forming a monosubstituted diphenylsilane, said method comprising reacting diphenylsilane with an alcohol, water, or both in the presence of a copper catalyst and a base so as to form a monosubstituted diphenylsilane, said copper catalyst comprising N,N'-bis(2,6-diisopropylphenyl)imidazole-2-ylidine n-heterocyclic carbene.

2. The method of claim 1, wherein said monosubstituted diphenylsilane is a monoalkoxylated diphenylsilane.

3. The method of claim 1, wherein said alcohol comprises a primary or secondary alcohol.

4. The method of claim 1, wherein said alcohol is chosen from methyl alcohol, ethyl alcohol, propyl alcohol, butyl alcohol, isopropyl alcohol, tertbutyl alcohol, poly(ethyleneglycol)s, diphenylsilanol, and mixtures thereof.

5. The method of claim 1, wherein said base is chosen from potassium t-butoxide, potassium ethoxide, potassium hydroxide, sodium t-butoxide, sodium ethoxide, sodium hydroxide, and mixtures thereof.

6. The method of claim 1, wherein said reacting yields a reaction product and at least about 90% of that reaction product is said monosubstituted diphenylsilane.

7. The method of claim 6, wherein said reacting is carried out for a time period of less than about 60 minutes.

8. The method of claim 1, wherein said monosubstituted diphenylsilane comprises one or more of:

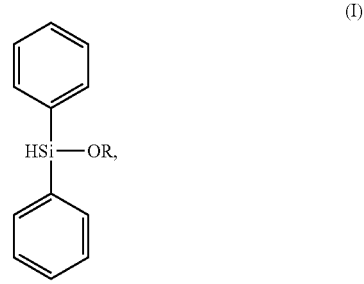

where R is an alkyl:

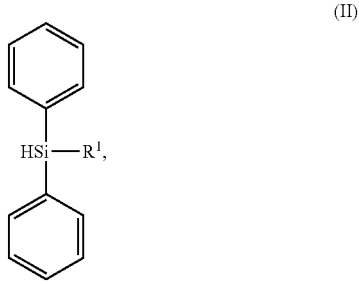

where $R^1$ is $—(OCH_2CH_2)_nOR$, where n is 1 or greater and R is an alkyl; and

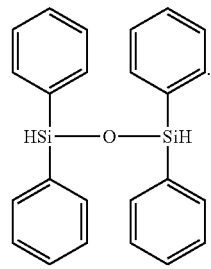

9. The method of claim 1, wherein:
said alcohol is chosen from methyl alcohol, ethyl alcohol, propyl alcohol, butyl alcohol, isopropyl alcohol, tertbutyl alcohol, poly(ethyleneglycol)s, diphenylsilanol, and mixtures thereof;
wherein said base is chosen from potassium t-butoxide, potassium ethoxide, potassium hydroxide, sodium t-butoxide, sodium ethoxide, sodium hydroxide, and mixtures thereof;
said reacting is carried out for a time period of less than about 60 minutes; and at least about 90% of that reaction product is said monosubstituted diphenylsilane.

10. The method of claim 9, wherein said monosubstituted diphenylsilane is a monoalkoxylated diphenylsilane.

11. A reaction method comprising reacting diphenylsilane with an alcohol, water, or both in the presence of N,N'-bis(2,6-diisopropylphenyl)imidazole-2-ylidine n-heterocyclic carbene and a base.

12. The method of claim 11, wherein said alcohol comprises a primary or secondary alcohol.

13. The method of claim 11, wherein said alcohol is chosen from methyl alcohol, ethyl alcohol, propyl alcohol, butyl alcohol, isopropyl alcohol, tertbutyl alcohol, poly(ethyleneglycol)s, diphenylsilanol, and mixtures thereof.

14. The method of claim 11, wherein said base is chosen from potassium t-butoxide, potassium ethoxide, potassium hydroxide, sodium t-butoxide, sodium ethoxide, sodium hydroxide, and mixtures thereof.

15. The method of claim 11, wherein said reacting yields a reaction product and at least about 90% of that reaction product is a monosubstituted diphenylsilane.

16. The method of claim 15, wherein said reacting is carried out for a time period of less than about 60 minutes.

\* \* \* \* \*